(12) United States Patent
Shen et al.

(10) Patent No.: US 10,911,331 B2
(45) Date of Patent: Feb. 2, 2021

(54) SERVICE CONFIGURATION METHOD AND APPARATUS FOR NETWORK SERVICE

(71) Applicant: HUAWEI TECHNOLOGIES CO., LTD., Guangdong (CN)

(72) Inventors: Weixiang Shen, Shenzhen (CN); Haiguang Xia, Shenzhen (CN); Fei Jia, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 119 days.

(21) Appl. No.: 16/012,893

(22) Filed: Jun. 20, 2018

(65) Prior Publication Data

US 2018/0316578 A1 Nov. 1, 2018

Related U.S. Application Data

(63) Continuation of application No. PCT/CN2017/076928, filed on Mar. 16, 2017.

(30) Foreign Application Priority Data

Mar. 22, 2016 (CN) .......................... 2016 1 0165089

(51) Int. Cl.
*G06F 15/173* (2006.01)
*H04L 12/24* (2006.01)

(52) U.S. Cl.
CPC ...... *H04L 41/5054* (2013.01); *H04L 41/0886* (2013.01); *H04L 41/50* (2013.01); *H04L 41/082* (2013.01); *H04L 41/0806* (2013.01)

(58) Field of Classification Search
CPC .. H04L 41/5054; H04L 41/0886; H04L 41/50
(Continued)

(56) References Cited

U.S. PATENT DOCUMENTS

2013/0058228 A1 3/2013 Koponen et al.
2014/0023366 A1 1/2014 Zang et al.
(Continued)

FOREIGN PATENT DOCUMENTS

CN 104639361 A 5/2015
CN 104734931 A 6/2015
(Continued)

OTHER PUBLICATIONS

ETSI GS NFV-MAN 001 V1.1.1 (Dec. 2014),Network Functions Virtualisation (NFV);Management and Orchestration, dated Dec. 2014,total 184 pages.
(Continued)

*Primary Examiner* — Duyen M Doan
(74) *Attorney, Agent, or Firm* — Womble Bond Dickinson (US) LLP

(57) ABSTRACT

Embodiments of this application provide a service configuration method and apparatus for a network service. In at least some embodiments, a network service instantiation request that includes a preset service configuration event that is for a network service and that is related to a network environment of a carrier is received. Service configuration information is sent to a configuration system according to the service configuration event, so that the configuration system performs service configuration on the network service according to the service configuration information. In at least some embodiments, an instantiation procedure of a network service does not need to be manually interrupted to avoid a configuration error caused by manual editing and modification. In at least some embodiments, as the instantiation procedure of the network service is not interrupted, network service go-live efficiency is improved.

14 Claims, 8 Drawing Sheets

(58) Field of Classification Search
USPC .................................................. 709/203, 220
See application file for complete search history.

(56) References Cited

U.S. PATENT DOCUMENTS

| | | | |
|---|---|---|---|
| 2016/0157084 A1* | 6/2016 | Tsubouchi | H04W 8/12 |
| | | | 455/432.1 |
| 2016/0299772 A1* | 10/2016 | Seenappa | G06F 11/16 |
| 2017/0034318 A1 | 2/2017 | Gong et al. | |
| 2017/0244596 A1 | 8/2017 | Chen | |
| 2017/0257276 A1* | 9/2017 | Chou | H04L 41/0896 |
| 2018/0004576 A1* | 1/2018 | Gokurakuji | G06F 9/46 |
| 2018/0013586 A1 | 1/2018 | Wang | |
| 2018/0131557 A1* | 5/2018 | Chou | H04L 41/08 |

FOREIGN PATENT DOCUMENTS

| | | |
|---|---|---|
| CN | 104954220 A | 9/2015 |
| CN | 105282765 A | 1/2016 |
| EP | 3133794 A1 | 2/2017 |
| EP | 3059900 B1 | 11/2017 |
| WO | 2015157896 A1 | 10/2015 |
| WO | 2015172362 A1 | 11/2015 |
| WO | 2016029821 A1 | 3/2016 |

OTHER PUBLICATIONS

Intel Corporation et al: data modelling and service chains alignment; NFVMAN(14)000035, Jan. 10, 2014, XP014227982, 18 pages.
ETSI GS NFV-MAN 001 V0.1.0 (Dec. 2013),Network Functions Virtualisation (NFV);Management and Orchestration, dated Dec. 2013,total 90 pages.

* cited by examiner

SERVICE CONFIGURATION METHOD AND APPARATUS FOR NETWORK SERVICE

CROSS-REFERENCE TO RELATED APPLICATIONS

This application is a continuation of International Application No. PCT/CN2017/076928, filed on Mar. 16, 2017, which claims priority to Chinese Patent Application No. 201610165089.6, filed on Mar. 22, 2016. The disclosures of the aforementioned applications are hereby incorporated by reference in their entireties.

TECHNICAL FIELD

Embodiments of this application relate to communications technologies, and in particular, to a service configuration method and apparatus for a network service.

BACKGROUND

Currently, the European Telecommunications Standards Institute (ETSI) sets up the Network Function Virtualization Industry Specification Group (NFV ISG), so as to enable, by using a virtualization technology in Internet technologies (IT), general-purpose hardware to implement some network functions. Therefore, a network function needs to be capable of running on general-purpose hardware in a virtualized network function (VNF) manner. The VNF herein is a virtualized entity having a network function. For example, for a VNF having a function of a mobility management entity (MME), this VNF is a virtual MME. In addition, the VNF is deployed on one or more virtual machines (VM), so that the VNF can run and become a VNF instance. This is a process of instantiating the VNF.

In a network functions virtualization management and orchestration (NFV MANO) architecture used in a current standard, the NFV-MANO may be used to manage a network functions virtualization infrastructure (NFVI) and orchestrate resources required by a network service (NS) and a VNF. The NFVI includes a hardware resource, a virtual resource, and the like. The NS is a network service including multiple VNFs or multiple VNFs and physical network functions (PNFs) to provide a more comprehensive function. For example, an evolved packet core (EPC) that includes a virtual or physical MME, a serving gateway (SGW), a home subscriber server (HSS), and virtual links between the virtual or physical MME, the SGW, and the HSS may be referred to as an NS. The capability of managing and orchestrating the VNF by the NFV-MANO actually includes conventional fault management, configuration management, accounting management, performance management, and security management (FCAPS). However, a current NFV-MANO mainly focuses on capabilities of creating a VNF and managing an NFVI resource required in life cycle management of the VNF, which are collectively referred to as VNF management herein.

The VNF management needs to support a capability of VNF life cycle management, including at least the following operation functions: VNF instantiation (creating a VNF), VNF resilience (increasing or decreasing a capacity of a VNF), VNF update and upgrade (changing software and a configuration of a VNF), and VNF termination (releasing an NFVI resource occupied by a VNF) to ensure that after these operations are performed on a VNF, the VNF can still normally provide a service capability. In addition to allocation of an NFVI resource to a VNF, the VNF management needs to support service configuration of the VNF (for example, the service configuration of the VNF needs to be included in a VNF instantiation procedure). The service configuration of the VNF is related to an environment of a legacy network of a carrier and a specific NS.

Currently, when service configuration is performed on a VNF, NFVI resource orchestration and service configuration of the VNF is divided into two independent stages: "virtual resource allocation and software installation of the VNF" and "service configuration of the VNF", and an operator manually performs the two steps to complete a VNF life cycle management operation. A used service configuration command for the VNF is manually edited and executed by the operator. This may introduce a manual configuration error. Moreover, during the service configuration of the VNF, the operator needs to perform two steps. As a result, a life cycle management transaction flow of the VNF is interrupted, and VNF go-live efficiency is low.

SUMMARY

Embodiments of this application provide a service configuration method and apparatus for a network service to avoid an error in service configuration of a VNF and increase VNF go-live efficiency comparing to conventional techniques.

In at least one embodiment, a service configuration method for a network service includes receiving a network service instantiation request, where the network service instantiation request includes a preset service configuration event that is for a network service and that is related to a network environment of a carrier; and sending service configuration information to a configuration system according to the service configuration event, so that the configuration system performs service configuration on the network service according to the service configuration information.

In at least one embodiment, the service configuration event can effectively reflect a current network environment of the carrier, and can directly or indirectly provide, when service configuration is performed on a network service in an NFV MANO system in the current network environment of the carrier, a parameter, a script, or the like required for service configuration. A form or content of the service configuration event is not limited herein, provided that the service configuration event can enable service configuration to be automatically completed for the network service in the NFV MANO system without interruption of an instantiation procedure or another procedure.

In at least one embodiment, the service configuration information is related to the service configuration event. The service configuration information may be a direct form or an indirect form of the service configuration event, or may be other information related to the service configuration event. A specific form of the service configuration information is not limited in this embodiment of this application, provided that the service configuration information can enable service configuration to be automatically completed for the network service in the NFV MANO system without interruption of an instantiation procedure or another procedure.

In at least one embodiment, a network service instantiation request sent to a MANO carries a preset service configuration event that is for a network service and that is related to a network environment of a carrier, so that the MANO can send service configuration information to a configuration system according to the service configuration event, and then the configuration system performs service configuration on the network service according to the service configuration information after the MANO completes resource allocation and service software installation for the network service. Therefore, an instantiation procedure of a network service does not need to be manually interrupted. That is, a service configuration command does not need to be manually modified at a service configuration stage of the network service. This avoids a configuration error caused by manual editing and modification. In addition, because the instantiation procedure of the network service is not interrupted, network service go-live efficiency is improved.

In at least one embodiment, the service configuration event is used to indicate a service configuration template or a workflow that is executed by the network service in a current operation scenario. Optionally, the service configuration event may include an identifier of the service configuration template or an identifier of the workflow that are executed by the network service in the current scenario, and the corresponding service configuration template or the corresponding workflow may be stored in a directory server corresponding to the MANO. Optionally, the service configuration event may directly include specific content of the service configuration template or the workflow that should be executed by the network service in the current scenario.

In at least one embodiment, the service configuration event includes a name of the service configuration event, the service configuration template in the current scenario, and a service parameter required when the service configuration template is being executed.

In at least one embodiment, the sending service configuration information to a configuration system according to the service configuration event, so that the configuration system performs service configuration on the network service according to the service configuration information includes sending the service configuration event to the configuration system, so that the configuration system performs service configuration on the network service according to the service configuration event.

In at least one embodiment, the sending service configuration information to a configuration system according to the service configuration event, so that the configuration system performs service configuration on the network service according to the service configuration information includes generating a service configuration command according to the name of the service configuration event, the service configuration template in the current operation scenario, and the service parameter that are in the service configuration event; and sending the service configuration command to the configuration system, so that the configuration system performs service configuration on the network service according to the service configuration command.

In at least one embodiment, the method further includes receiving a service configuration result sent by the configuration system.

In at least one embodiment, in the service configuration method for a network service provided in the foregoing possible designs, the service configuration information exchanged between the MANO and the configuration system may be in different forms. This enriches diversity of interaction between the MANO and the configuration system, and improves reliability during service configuration of the network service.

In at least one embodiment a service configuration method for a network service includes receiving service configuration information sent by a management orchestrator MANO according to a service configuration event that is for a network service and that is related to a network environment of a carrier; and performing service configuration on the network service according to the service configuration information.

In at least one embodiment, the service configuration event is used to indicate a service configuration template or a workflow that is executed by the network service in a current operation scenario.

In at least one embodiment, the service configuration event includes a name of the service configuration event, the service configuration template in the current scenario, and a service parameter required when the service configuration template is being executed.

In at least one embodiment, the performing service configuration on the network service according to the service configuration information includes parsing the service configuration event to obtain the name of the service configuration event, the service configuration template in the current scenario, and the service parameter; generating a service configuration command according to the name of the service configuration event, the service configuration template in the current scenario, and the service parameter; and performing service configuration on the network service according to the service configuration command.

In at least one embodiment, the receiving service configuration information sent by a management orchestrator MANO according to a service configuration event that is for a network service and that is related to a network environment of a carrier includes receiving a service configuration command sent by the MANO, where the service configuration command is generated by the MANO according to the name of the service configuration event, the service configuration template in the current scenario, and the service parameter; and the performing service configuration on the network service according to the service configuration information includes performing service configuration on the network service according to the service configuration command.

In at least one embodiment, the method further includes sending a service configuration result to the MANO.

In at least one embodiment, a service configuration apparatus for a network service includes a receiving module, configured to receive a network service instantiation request, where the network service instantiation request includes a preset service configuration event that is for a network service and that is related to a network environment of a carrier; and a sending module, configured to send service configuration information to a configuration system according to the service configuration event, so that the configuration system performs service configuration on the network service according to the service configuration information.

In at least one embodiment, the service configuration event is used to indicate a service configuration template or a workflow that is executed by the network service in a current operation scenario.

In at least one embodiment, the service configuration event includes a name of the service configuration event, the service configuration template in the current scenario, and a service parameter required when the service configuration template is being executed.

In at least one embodiment, the sending module is configured to send the service configuration event to the configuration system, so that the configuration system performs service configuration on the network service according to the service configuration event.

In at least one embodiment, the sending module includes a generation unit, configured to generate a service configuration command according to the name of the service configuration event, the service configuration template in the current operation scenario, and the service parameter that are in the service configuration event; and a sending unit, configured to send the service configuration command to the configuration system, so that the configuration system performs service configuration on the network service according to the service configuration command.

In at least one embodiment, the receiving module is further configured to receive a service configuration result sent by the configuration system.

In at least one embodiment a service configuration apparatus for a network service includes a receiving module, configured to receive service configuration information sent by a management orchestrator MANO according to a service configuration event that is for a network service and that is related to a network environment of a carrier; and a configuration module, configured to perform service configuration on the network service according to the service configuration information.

In at least one embodiment, the service configuration event is used to indicate a service configuration template or a workflow that is executed by the network service in a current operation scenario.

In at least one embodiment, the service configuration event includes a name of the service configuration event, the service configuration template in the current scenario, and a service parameter required when the service configuration template is being executed.

In at least one embodiment, the configuration module includes a parsing unit, configured to parse the service configuration event to obtain the name of the service configuration event, the service configuration template in the current scenario, and the service parameter; a generation unit, configured to generate a service configuration command according to the name of the service configuration event, the service configuration template in the current scenario, and the service parameter; and a configuration unit, configured to perform service configuration on the network service according to the service configuration command.

In at least one embodiment, the receiving module is configured to receive a service configuration command sent by the MANO, where the service configuration command is generated by the MANO according to the name of the service configuration event, the service configuration template in the current scenario, and the service parameter. The configuration module is configured to perform service configuration on the network service according to the service configuration command.

In at least one embodiment, the apparatus further includes a sending module, configured to send a service configuration result to the MANO.

In at least one embodiment, a management orchestrator MANO includes a receiver, configured to receive a network service instantiation request, where the network service instantiation request includes a preset service configuration event that is for a network service and that is related to a network environment of a carrier; and a transmitter, configured to send service configuration information to a configuration system according to the service configuration event, so that the configuration system performs service configuration on the network service according to the service configuration information.

In at least one embodiment, the management orchestrator MANO further includes a processor that is independent of the receiver and the transmitter and that is in communication connection to the receiver and the transmitter. The processor is configured to obtain the service configuration information according to the service configuration event, and send the service configuration information to the configuration system by using the transmitter.

The MANO may include a network functions virtualization orchestrator (NFVO), a virtualized network function manager (VNFM), and a virtualized infrastructure manager (VIM). That is, the NFVO, the VNFM, and the VIM are all a part of the MANO. The NFVO, the VNFM, and the VIM may be separately deployed on different hardware devices and form all or a part of the MANO by means of physical connection, or may be deployed on a same hardware device (that is, software having functions of the NFVO, the VNFM, and the VIM is loaded on the hardware device) and form all or a part of the MANO. Optionally, when the MANO includes an NFVO, a VNFM, and a VIM deployed on different hardware devices, the receiver and the transmitter may be integrated into the VNFM. Optionally, when the MANO includes an NFVO, a VNFM, and a VIM deployed on a same hardware device, a position in which the receiver and the transmitter are integrated is not limited.

Optionally, the transmitter may be an output interface that has a communication function and an information sending function and that is in the MANO, and the receiver may be an input interface that has a communication function and an information receiving function and that is in the MANO.

In at least one embodiment, the service configuration event is used to indicate a service configuration template or a workflow that is executed by the network service in a current operation scenario.

In at least one embodiment, the service configuration event includes a name of the service configuration event, the service configuration template in the current scenario, and a service parameter required when the service configuration template is being executed.

In at least one embodiment, the transmitter is configured to send the service configuration event to the configuration system, so that the configuration system performs service configuration on the network service according to the service configuration event.

In at least one embodiment, the MANO includes a processor. Optionally, the processor may be a processing chip having a function of generating a service configuration command and another function, and may be integrated into the VNFM.

The processor is configured to generate a service configuration command according to the name of the service configuration event, the service configuration template in the current operation scenario, and the service parameter that are in the service configuration event.

The transmitter is configured to send the service configuration command generated by the processor to the configuration system, so that the configuration system performs service configuration on the network service according to the service configuration command.

In at least one embodiment, the receiver is configured to receive a service configuration result sent by the configuration system.

In at least one embodiment a configuration system includes a receiver, configured to receive service configuration information sent by a management orchestrator MANO according to a service configuration event that is for a network service and that is related to a network environment of a carrier; and a processor configured to perform service configuration on the network service according to the service configuration information.

Optionally, the configuration system may be an element management system (EMS), or may be an operation support system (OSS). The receiver may be an input interface that has a communication function and an information receiving function and that is in the configuration system. The processor may be a processing chip that has a service configuration function and another function and that is in the configuration system.

In at least one embodiment, the service configuration event is used to indicate a service configuration template or a workflow that is executed by the network service in a current operation scenario.

In at least one embodiment, the service configuration event includes a name of the service configuration event, the service configuration template in the current scenario, and a service parameter required when the service configuration template is being executed.

In at least one embodiment, the processor is configured to parse the service configuration event to obtain the name of the service configuration event, the service configuration template in the current scenario, and the service parameter; generate a service configuration command according to the name of the service configuration event, the service configuration template in the current scenario, and the service parameter; and perform service configuration on the network service according to the service configuration command.

In at least one embodiment, the receiver is configured to receive a service configuration command sent by the MANO, where the service configuration command is generated by the MANO according to the name of the service configuration event, the service configuration template in the current scenario, and the service parameter.

The processor is configured to perform service configuration on the network service according to the service configuration command.

In at least one embodiment, the configuration system further includes a transmitter configured to send a service configuration result to the MANO. Optionally, the transmitter may be an output interface that has a communication function and an information sending function and that is in the configuration system.

In at least one embodiment, optionally, the network service includes a virtualized network function VNF, and the service configuration event is used to indicate a service configuration template or a workflow that is executed by the VNF in the current operation scenario.

Optionally, the network service includes a virtualized network function VNF and a physical network function PNF, and the service configuration event is used to indicate a first service configuration template or a first workflow that is executed by the VNF in the current operation scenario, and a second service configuration template or a second workflow that is executed by the PNF in the current operation scenario.

Optionally, the service configuration event is carried in a virtualized network function descriptor VNFD in a VNF instantiation request received by the MANO.

Optionally, the service configuration event is carried in a network service descriptor NSD in a network service instantiation request received by the MANO.

Optionally, the service configuration event is further used to indicate a service configuration template or a workflow that is executed by a virtualization deployment unit VDU of the VNF in the current operation scenario.

Optionally, the current operation scenario includes any one of an initialization scenario, a resilience scenario, an upgrade scenario, a security matrix scenario, or a service termination scenario. The service parameter includes at least one parameter of an IP address of a local end, a port of the local end, an IP address of a peer end, a port of the peer end, or a service type supported by the network service.

In at least one embodiment a service configuration system for a network service includes the MANO provided in the foregoing possible designs and the configuration system provided in the foregoing possible designs. Communication connection between the MANO and the configuration system may be implemented by using a corresponding communications bus and a corresponding communications interface.

In at least one embodiment, a computer program product includes a computer program. When read and executed by a processor or a chip of another type, the computer program can implement the service configuration method for a network service provided in the foregoing embodiments of this application.

DESCRIPTION OF EMBODIMENTS

Figure 1:
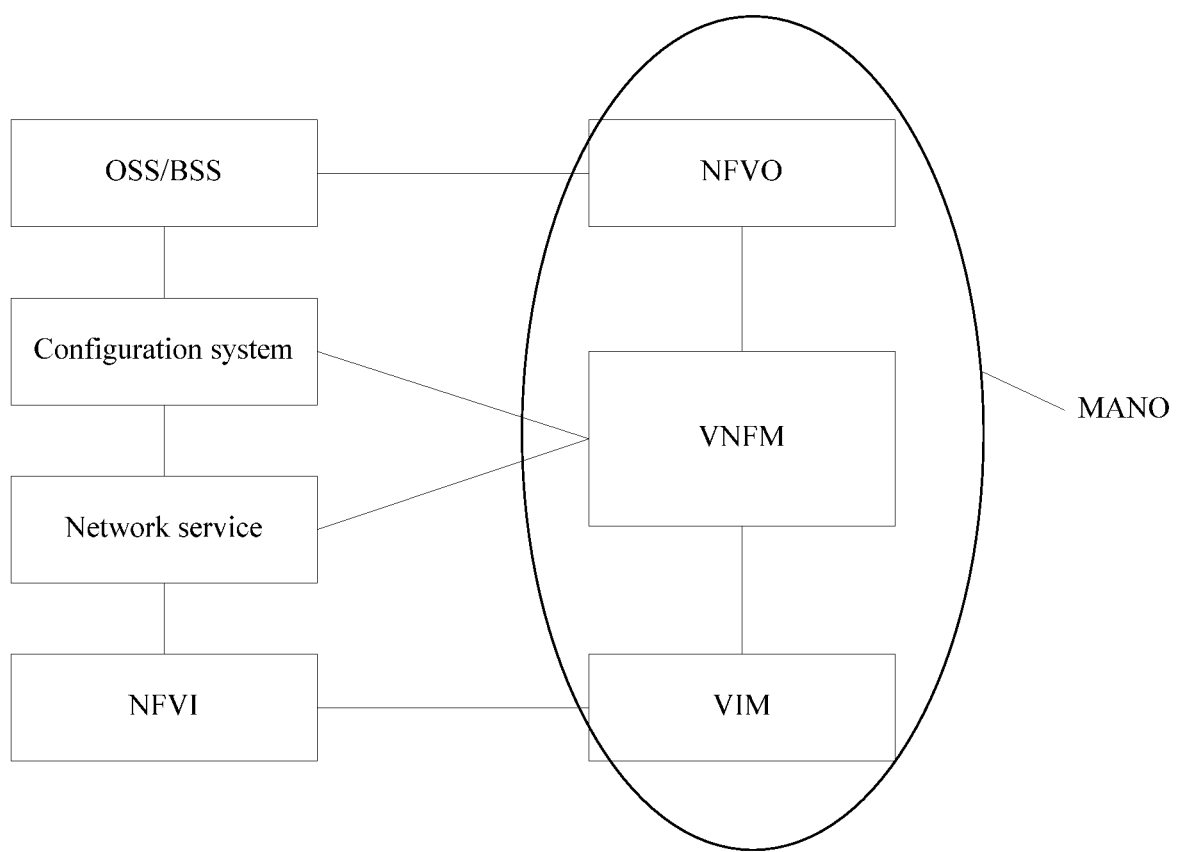
FIG. 1 is a diagram of an NFV MANO architecture according to an embodiment of this application.

A service configuration method for a VNF provided in embodiments of this application is applicable to an NFV MANO architecture shown in FIG. 1. The NFV MANO architecture may include an operation support system (OSS) or a business support system (BSS), a configuration system, a VNF, a physical network function (PNF), a network functions virtualization infrastructure (NFVI), an NFV orchestrator (NFVO), a VNF manager (VNFM), and a virtualized infrastructure manager (VIM). Optionally, the configuration system may be an element management system (EMS), or may be an OSS. FIG. 1 shows a case in which the configuration system is an EM. Referring to FIG. 1, the NFVI includes a hardware resource, a virtual resource, and a virtualization layer. The VIM is an entity for controlling and managing virtualization. The NFVO is responsible for orchestrating and managing an NFVI resource on a network side, and implementing service topology of NFV on the NFVI. The VNFM is responsible for managing a life cycle of a VNF instance. The NFVO, the VNFM, and the VIM in FIG. 1 are all a part of a MANO. In addition, the NFVO, the VNFM, and the VIM may be all deployed on different hardware devices or a same hardware device, provided that software having functions of the NFVO, the VNFM, and the VIM is loaded on the hardware devices/device.

In the conventional techniques, when service configuration is performed on the VNF, the configuration system cannot obtain sufficient information from a notification of the MANO to complete a service configuration operation on the VNF. Therefore, a VNF instantiation procedure needs to be manually interrupted, a service configuration command required by the configuration system is modified by means of manual editing, and then the configuration system is started again to complete the service configuration of the VNF. As a result, automatic service configuration of the VNF cannot be implemented, and a manual configuration error is easily caused. In addition, as the VNF instantiation procedure is manually interrupted, the VNF go-live efficiency is low. A service configuration method and apparatus for a VNF provided in the embodiments of this application are intended to resolve these issues in the conventional techniques.

Specific embodiments are used below to describe in detail the technical solutions of this application. The following several specific embodiments may be combined with each other, and a same or similar concept or process may not be described repeatedly in some embodiments.

Figure 2:
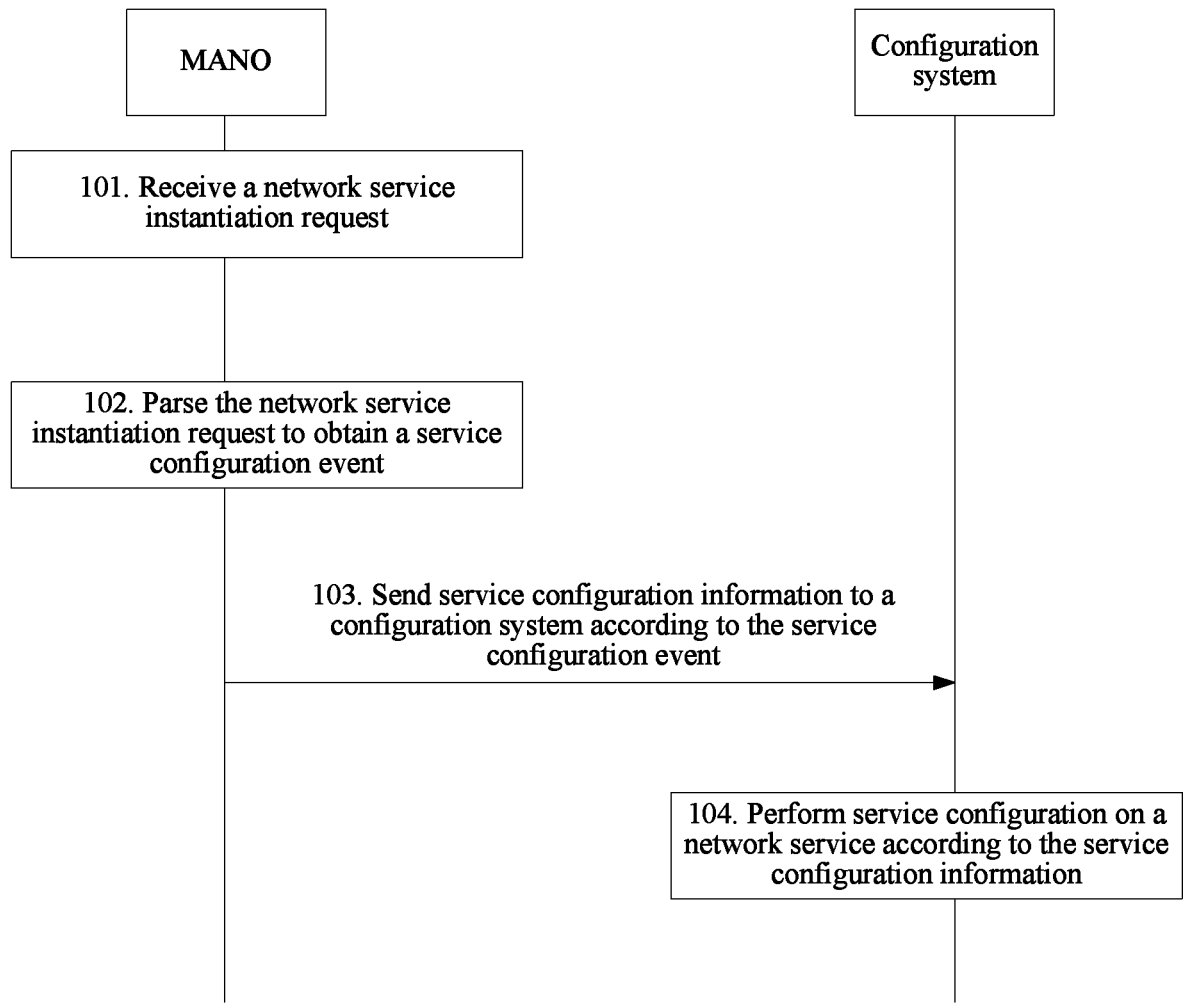
FIG. 2 is a signaling flowchart of a service configuration method for a network service according to an embodiment of this application.

FIG. 2 is a signaling flowchart of a service configuration method for a network service according to an embodiment of this application. A specific process in which a network service instantiation request sent to a MANO carries a service configuration event related to a network environment of a carrier, so that the MANO sends service configuration information to a configuration system according to the service configuration event, and then the configuration system performs service configuration on a current network service according to the service configuration information is provided in this embodiment. As shown in FIG. 2, the method may include the following operations.

S101. A MANO receives a network service instantiation request.

The network service instantiation request includes a preset service configuration event that is for a network service and that is related to a network environment of a carrier. Optionally, the service configuration event can effectively reflect a current network environment of the carrier, and can directly or indirectly provide, when service configuration is performed on a network service in an NFV MANO system in the current network environment of the carrier, a parameter, a script, or the like required for service configuration. In this embodiment of this application, a form or content of the service configuration event is not limited, provided that the service configuration event can enable service configuration to be automatically completed for the network service in the NFV MANO system without interruption of an instantiation procedure or another procedure. Optionally, the network environment of the carrier may be a specific quantity of IP addresses in a network of the carrier, or may be a quantity of global resources for signaling points in a network of the carrier, or the like. Specific content of the network environment of the carrier is not limited in this application.

In addition, the network service instantiation request in this embodiment may be initiated by an operator to the MANO, or may be initiated by another software device or another hardware device to the MANO. Optionally, using an operator as an example, the operator may send the network service instantiation request to the MANO, and the MANO may transfer the network service instantiation request to an internal VNFM, so that the VNFM parses the network service instantiation request. Optionally, the network service in this embodiment may include only VNFs and links between the VNFs, or may include VNFs, PNFs, and links between the VNFs and the PNFs. The links may include a link between VNFs, may further include a link between a VNF and a PNF, and may further include a link between PNFs. Therefore, the network service instantiation request may be a VNF instantiation request, or may be an NS instantiation request (if the network service instantiation request is the NS instantiation request, service configuration needs to be performed on both a VNF and a PNF).

Optionally, in an example, the network service includes only a VNF. Before the MANO obtains the network service instantiation request, a VNF supplier may predefine service configuration events in a VNF package file. After the VNF supplier defines the service configuration events, during a network design stage of the carrier, the operator may edit and modify these service configuration events in combination with the current network environment of the carrier, to obtain a service configuration event suitable for the current network environment of the carrier. When the network service includes a VNF and a PNF, a service configuration event may also be defined and modified with reference to the foregoing description, and a difference lies in that definition and modification of a service configuration event of the PNF are added.

Optionally, the network service instantiation request may carry a VNFD, or may carry a PNFD, or may carry an NSD. In this case, the preset service configuration event that is for the network service and that is related to the network environment of the carrier may be included in the VNFD, or may be included in the PNFD, or may be included in the NSD. This is determined according to a type of a network element included in the network service. The VNFD may be used to describe information such as a requirement of a VNF for a resource. The PNFD may be used to describe information such as a requirement of a PNF for a resource. The NSD is a network service description template corresponding to a network service and may be used to describe information about an NS, for example, a quantity of VNFs and a quantity of PNFs included in an NS, and links between network elements. The NSD may include a VNFD, or may include a PNFD. This is determined according to a type of a network element included in the network service.

S102. The MANO parses the network service instantiation request to obtain a service configuration event.

Specifically, after receiving the network service instantiation request, the MANO parses the network service instantiation request. The MANO not only may obtain the service configuration event, but also may learn related NFVI resource allocation information and service software installation information in the VNFD or the PNFD or the NSD in the network service instantiation request. Therefore, the MANO may complete resource allocation and service installation for the network service according to the NFVI resource allocation information and the service software installation information that are required by the network service and that are obtained through parsing.

S103. The MANO sends service configuration information to a configuration system according to the service configuration event.

Optionally, the MANO may send the service configuration information to the configuration system according to the service configuration event after completing the resource allocation and the service installation for the network service, or may send the service configuration information to the configuration system according to the service configuration event when performing the resource allocation and the service installation for the network service, or may send the service configuration information to the configuration system according to the service configuration event before performing the resource allocation and the service installation for the network service. A time at which the MANO sends the service configuration information to the configuration system is not limited in this embodiment of this application. In addition, the service configuration information is related to the service configuration event. The service configuration information may be a direct form or an indirect form of the service configuration event, or may be other information related to the service configuration event. A specific form of the service configuration information is not limited in this embodiment of this application, provided that the service configuration information can enable service configuration to be automatically completed for the network service in the NFV MANO system without interruption of an instantiation procedure or another procedure.

S104. The configuration system performs service configuration on a network service according to the service configuration information.

Specifically, when the service configuration information is sent to the configuration system by the MANO after the MANO completes the resource allocation and the service installation for the network service, the configuration system directly performs service configuration on the network service according to the service configuration information after receiving the service configuration information. When the service configuration information is sent to the configuration system by the MANO before the MANO performs the resource allocation and the service installation for the network service or is sent to the configuration system by the MANO when the MANO performs the resource allocation and the service installation for the network service, after receiving the service configuration information, the configuration system may perform service configuration on the network service according to the service configuration information only after the MANO completes the resource allocation and the service installation for the network service. Optionally, the MANO may notify the configuration system of current progresses of the resource allocation and the service software installation for the network service.

In the service configuration method for a network service provided in this embodiment of this application, a network service instantiation request sent to a MANO carries a preset service configuration event that is for a network service and that is related to a network environment of a carrier, so that the MANO can send service configuration information to a configuration system according to the service configuration event, and then the configuration system performs service configuration on the network service according to the service configuration information after the MANO completes resource allocation and service software installation for the network service. According to the method provided in this embodiment, a network service instantiation request carries a service configuration event that is related to an environment of a legacy network of a carrier and that has been configured in advance. Therefore, an instantiation procedure of a network service does not need to be manually interrupted. That is, a service configuration command does not need to be manually modified at a service configuration stage of the network service. This avoids a configuration error caused by manual editing and modification. In addition, because the instantiation procedure of the network service is not interrupted, network service go-live efficiency is improved.

Further, the service configuration event included in the network service instantiation request may be used to indicate a service configuration template or a workflow that should be executed by the network service in a current operation scenario. In a possible design, the service configuration event may include an identifier of the service configuration template or an identifier of the workflow that should be executed by the network service in the current scenario, and the corresponding service configuration template or the corresponding workflow may be stored in a directory server corresponding to the MANO. Optionally, in another possible design, the service configuration event may directly include specific content of the service configuration template or the workflow that should be executed by the network service in the current scenario.

It should be noted that, the operation scenario herein may be any operation scenario of the network service, for example, a scenario in which a software upgrade or a hardware upgrade is performed on the network service, or a scenario in which a capacity is increased or decreased for the network service. The current operation scenario is not limited in this embodiment of this application. The service configuration template indicated by the service configuration event may include multiple configuration command lines executed by the network service. The service configuration template may include any one of an initialization configuration template, a resilience configuration template, an upgrade configuration template, or a security matrix configuration template. The workflow indicated by the service configuration event may be used to indicate a configuration operation to be executed by the network service next.

In a possible implementation of this embodiment of this application, a specific process in which the MANO directly sends, to the configuration system, the service configuration event that is obtained by parsing the network service instantiation request is provided in this embodiment. That is, S103 and S104 may include sending, by the MANO, the service configuration event to the configuration system, so that the configuration system performs service configuration on the network service according to the service configuration event.

Specifically, in this possible implementation, the service configuration event may include the identifier of the service configuration template or the identifier of the workflow that should be executed by the network service in the current scenario. In this way, after the MANO sends the service configuration event to the configuration system, the configuration system may obtain, from the directory server corresponding to the MANO by using the identifier of the service configuration template or the identifier of the workflow in the service configuration event, the service configuration template or the workflow that should be executed by the network service in the current scenario, and then perform service configuration on the network service according to the service configuration template or the workflow. Optionally, the service configuration event may directly include the specific content of the service configuration template or the workflow that should be executed by the network service in the current scenario, and the MANO may directly send the content to the configuration system, so that the configuration system can perform service configuration on the network service according to the content.

In another possible implementation of this embodiment of this application, a specific process in which the MANO generates a service configuration command according to the service configuration event in the network service instantiation request, and sends the service configuration command to the configuration system is provided in this embodiment. That is, S103 and S104 may include generating, by the MANO, a service configuration command according to the service configuration event, and sending the service configuration command to a configuration system, so that the configuration system performs service configuration on the network service according to the service configuration command.

In this possible implementation, the service configuration event may include the identifier of the service configuration template or the identifier of the workflow that should be executed by the network service in the current scenario, so that after obtaining the service configuration event, the MANO obtains, from the directory server corresponding to the MANO by using the identifier of the service configuration template or the identifier of the workflow in the service configuration event, the service configuration template or the workflow that should be executed by the network service in the current scenario, and then generates the service configuration command according to the service configuration template or the workflow and sends the service configuration command to the configuration system, so that the configuration system performs service configuration on the network service according to the service configuration command. Optionally, the service configuration event may directly include the specific content of the service configuration template or the workflow that should be executed by the network service in the current scenario, so that the MANO can directly generate the service configuration command according to the content and send the service configuration command to the configuration system, and then the configuration system performs service configuration on the network service according to the service configuration command.

In the service configuration method for a network service provided in the foregoing two possible implementations, the service configuration information exchanged between the MANO and the configuration system may be in different forms. This enriches diversity of interaction between the MANO and the configuration system, and further improves reliability during service configuration of the network service.

Figure 3:
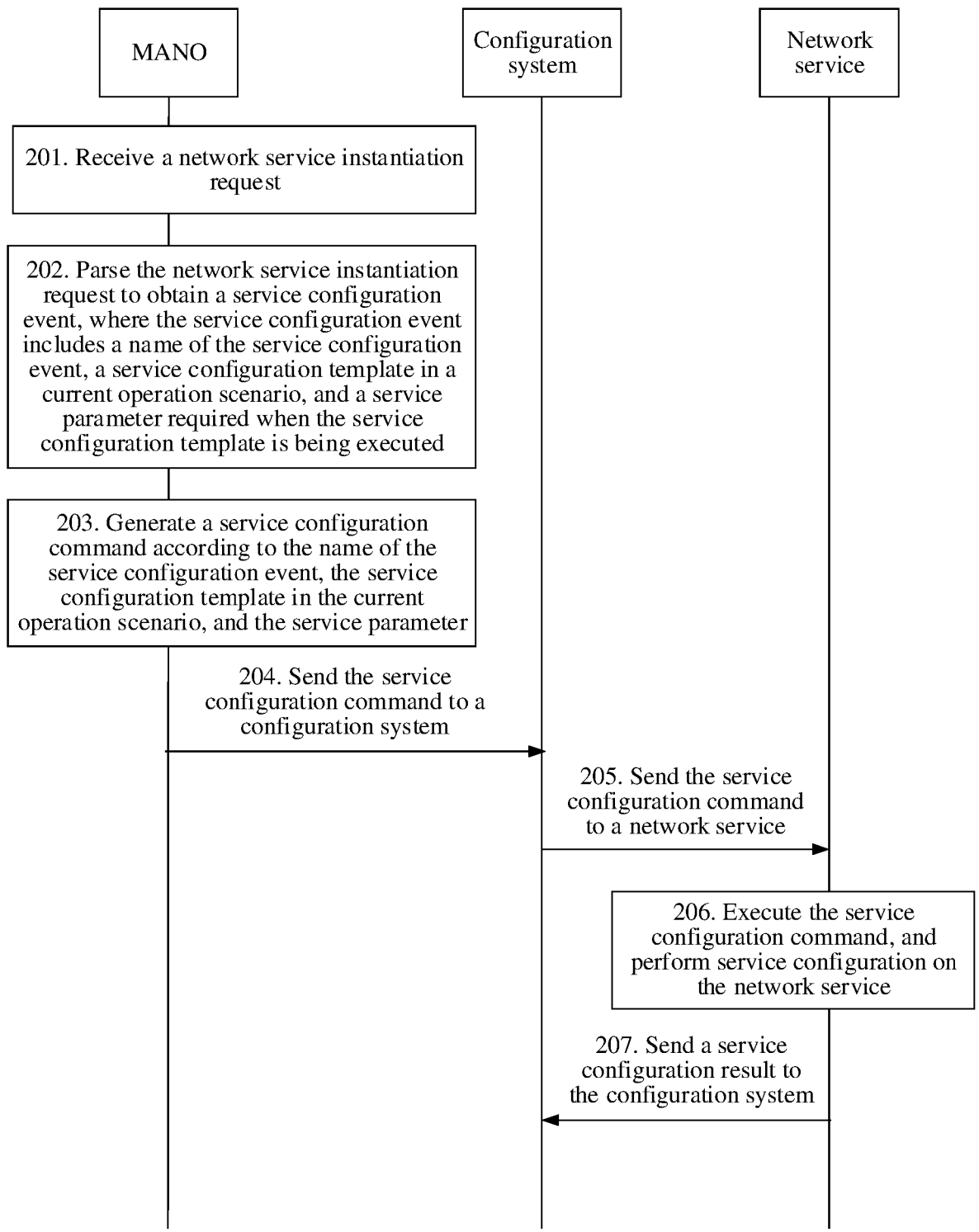
FIG. 3 is a signaling flowchart of a service configuration method for a network service according to an embodiment of this application.

FIG. 3 is a signaling flowchart of a service configuration method for a network service according to an embodiment of this application. A specific process in which a MANO and a configuration system exchange service configuration information to jointly complete service configuration of a network service is provided in this embodiment. Based on the foregoing embodiment, the service configuration event includes a name of the service configuration event, the service configuration template in the current scenario, and a service parameter required when the service configuration template is being executed. Optionally, the service configuration template in the current operation scenario and the service parameter required when the service configuration template is being executed that are in the service configuration event may be replaced with "the workflow in the current operation scenario and a service parameter required when the workflow is being executed". Content included in the service configuration event in this embodiment is described by using the former as an example. Referring to FIG. 3, the method includes the following operations.

S201. The MANO receives a network service instantiation request.

S202. The MANO parses the network service instantiation request to obtain a service configuration event, and the service configuration event includes a name of the service configuration event, a service configuration template in a current scenario, and a service parameter required when the service configuration template is being executed.

Specifically, for specific processes of S201 and S202, refer to the specific descriptions in the foregoing embodiment. Details are not described herein again. For the service configuration event, refer to an information model shown in Table 1. The name of the service configuration event in the service configuration event may be any type of character or field. The service configuration template in the current operation scenario in the service configuration event may be a specific service configuration script, or may be path information directing to a specific service configuration script. That is, the service configuration template in the current operation scenario may include a specific service configuration script, or may include path information directing to a service configuration script, and the path information directs to Config of a server. In addition, the current operation scenario may include any one of an initialization scenario, a resilience scenario, an upgrade scenario, a security matrix scenario, or a service termination scenario. The service parameter that is in the service configuration event and that is required when the service configuration template is being executed may include at least one parameter of an IP address of a local end, a port of the local end, an IP address of a peer end, a port of the peer end, or a service type supported by a network service. For specific details, refer to Table 1.

TABLE 1

| Name | Type | Cardinality | Description |
|---|---|---|---|
| event_id | Leaf | 1 | Name of the service configuration event |
| cfg_script | Leaf | 0 . . . 1 | The service configuration template may be a path on which the service configuration template is located (for example, the service configuration template may be stored on a server, or may be stored on a server on which a VNF instance is located), or may be a specific service configuration script. |
| cfg_parameters | Leaf | 0 . . . N | Service parameters required for running cfg_script. These parameters are defined in a "key-value" manner. In different cases, the MANO may be responsible for determining values of these service parameters. |

In addition, it should be noted that, the network service may include a VNF, or the network service may include a VNF and a PNF.

Optionally, when the network service is a VNF, the network service instantiation request is a VNF instantiation request. In this case, the service configuration event in the network service instantiation request may be a service configuration event carried in a VNFD in the VNF instantiation request. The service configuration event may be used to indicate a service configuration template or a workflow that is executed by the VNF in the current operation scenario. Optionally, the service configuration event may be further used to indicate a service configuration template or a workflow that should be executed by a virtualization deployment unit (VDU) of the VNF in the current operation scenario, and one VNF may include multiple VDUs.

Optionally, when the network service is a VNF and a PNF, the service configuration event in the network service instantiation request may be a service configuration event carried in an NSD. The service configuration event may be used to indicate a first service configuration template or a first workflow that should be executed by the VNF in the current operation scenario, and a second service configuration template or a second workflow that should be executed by the PNF in the current operation scenario. Optionally, the service configuration event may be divided into two parts, one part is carried in a VNFD in the NSD, and the other part is carried in a PNFD in the NSD.

S203. The MANO generates a service configuration command according to the name of the service configuration event, the service configuration template in the current operation scenario, and the service parameter.

Specifically, after the MANO obtains, by parsing the service configuration event, the name of the service configuration event, the service configuration template in the current operation scenario, and the service parameter required for executing the service configuration template, the MANO may automatically generate the service configuration command according to the name of the service configuration event, the service configuration template, and the service parameter, and the service configuration command may include at least one command line. It should be noted that, a time sequence relationship is not limited between a process in which the MANO generates the service configuration command and a process in which the MANO performs NFVI resource allocation and service software installation for the network service. The two processes may be simultaneously performed, or may be sequentially performed.

S204. The MANO sends the service configuration command to the configuration system.

It should be noted that, the MANO needs to send the service configuration command to the configuration system after completing the NFVI resource allocation and the service software installation for the network service according to the network service instantiation request.

S205. The configuration system sends the service configuration command to a network service.

Specifically, the configuration system may send the service configuration command to the network service in two manners. The two manners are as follows:

A first manner: The configuration system may place the received service configuration command in a memory or a cache. Then, after establishing a connection to the network service, the configuration system sends command lines in the configuration command in the memory or the cache to the network service one by one. A first command line may be sent to the network service, and after the network service successfully executes the first command line, a second command line is then sent, and so on. When the network service fails to execute a command line, a configuration rollback state may be entered, and the configuration system may send the command line again.

A second manner: The configuration system directly sends all command lines in the service configuration command to a VNF.

S206. The network service executes the service configuration command, and performs service configuration on the network service.

S207. The network service sends a service configuration result to the configuration system.

The service configuration command is generated by the MANO according to the service configuration event. Alternatively, S203 and S204 may be replaced with S203' to S205', which are specifically:

S203'. The MANO sends the service configuration event to a configuration system.

S204'. The configuration system parses the service configuration event to obtain the name of the service configuration event, the service configuration template in the current scenario, and the service parameter.

S205'. The configuration system generates a service configuration command according to the name of the service configuration event, the service configuration template in the current scenario, and the service parameter.

It should be noted that, the MANO may provide a global resource management function, so that the MANO can generate a specific service configuration command. This brings an advantage as follows. A configuration system in a legacy network of a carrier is usually an existing stock system, and it is not suitable to carry out excessive modification and adaption work on the configuration system. When the specific service configuration command can be generated by the MANO, a workload of modification and adaption for the configuration system may be alleviated. In addition, at a preparation stage, a design tool (designer) that is used by an operator when the operator edits and modifies, according to a network environment of the carrier, a service configuration event that has been defined by a VNF supplier may be provided by the MANO. In addition, the MANO may provide a tool for editing a service configuration script of a network service. By means of this tool, a service configuration template provided by a network element supplier may be conveniently correlated with a resource in the legacy network of the carrier, so that the MANO or the configuration system can automatically generate a service configuration command without manual configuration, thereby avoiding a configuration error caused by manual editing and modification.

Figure 4:
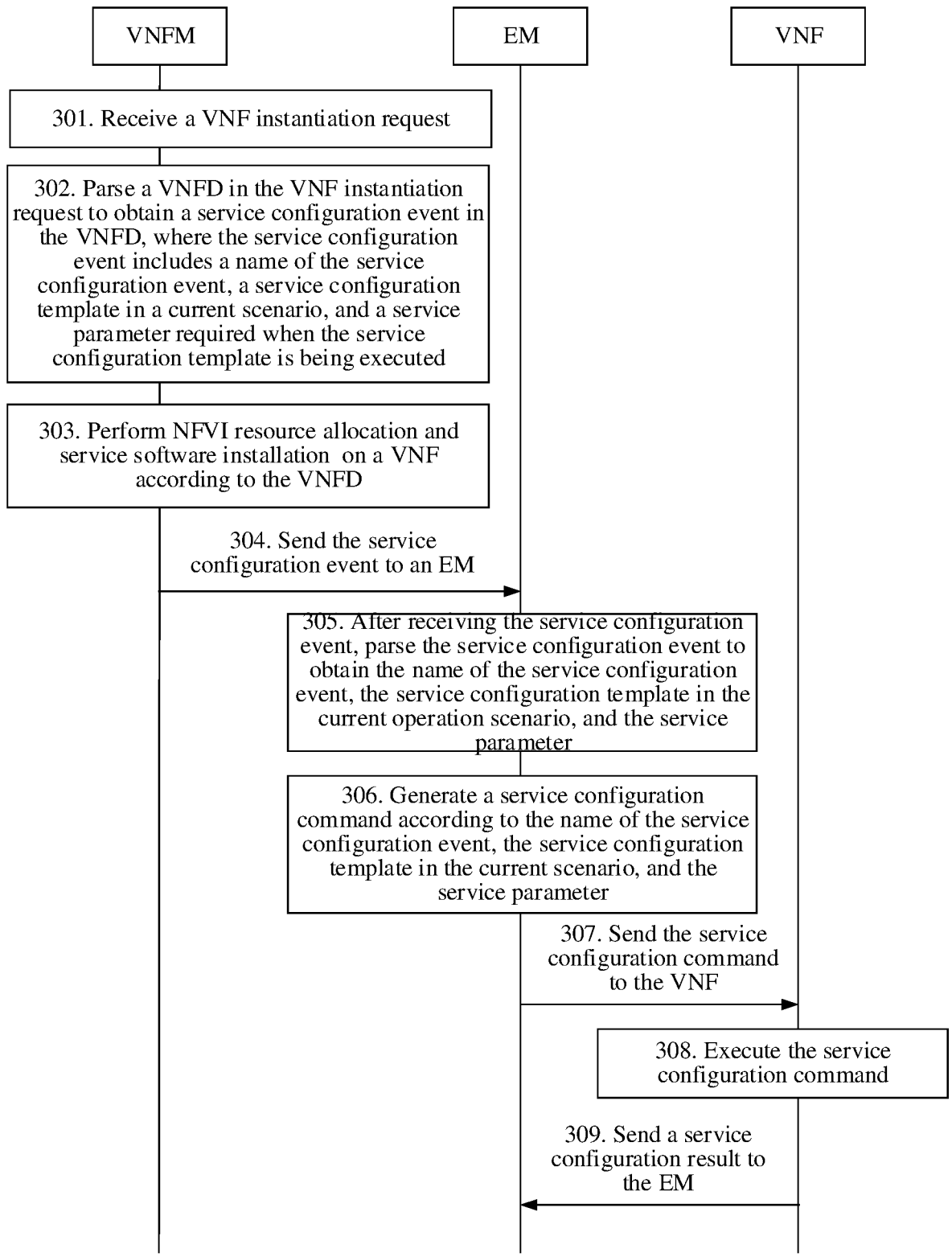
FIG. 4 is a signaling flowchart of a service configuration method for a network service according to an embodiment of this application.

To explain a specific process of an embodiment of this application more clearly, using a VNF instantiation procedure as an example, the network service is a VNF, and the configuration system may be an EM. Referring to FIG. 4, the method includes the following operations.

S301. A VNFM receives a VNF instantiation request.

S302. The VNFM parses a VNFD in the VNF instantiation request to obtain a service configuration event in the VNFD, and the service configuration event includes a name of the service configuration event, a service configuration template in a current scenario, and a service parameter required when the service configuration template is being executed.

S303. The VNFM performs NFVI resource allocation and service software installation on the VNF according to the VNFD.

It should be noted that, a time sequence relationship is not limited between S302 and S303.

S304. The VNFM sends the service configuration event to the EM.

It should be noted that, a time sequence relationship is not limited between S303 and S304. There is a message interface between the VNFM and the EM. By using the message interface, the VNFM may provide, to the EM, the service configuration event representing a deployment status of the VNF, and the EM may provide a service configuration result of the VNF to the VNFM by using the interface.

S305. After receiving the service configuration event, the EM parses the service configuration event to obtain the name of the service configuration event, the service configuration template in the current scenario, and the service parameter.

S306. The EM generates a service configuration command according to the name of the service configuration event, the service configuration template in the current scenario, and the service parameter.

S307. The EM sends the service configuration command to the VNF.

It should be noted that, the EM may send the service configuration command to the VNF only after a MANO completes the NFVI resource allocation and the service software installation for the VNF.

S308. The VNF executes the service configuration command.

S309. The VNF sends a service configuration result to the EM.

For specific processes of S301 to S309, refer to the specific operation processes of S201 to S207. Details are not described herein again.

In the service configuration method for a network service provided in this embodiment of this application, a network service instantiation request sent to a MANO carries a preset service configuration event that is for a network service and that is related to a network environment of a carrier, so that the MANO can generate a service configuration command according to the service configuration event, and send the service configuration command to a configuration system, and then the configuration system completes service configuration of the network service according to the service configuration command. According to the method provided in this embodiment, a network service instantiation request carries a service configuration event that is related to an environment of a legacy network of a carrier and that has been configured in advance. Therefore, an instantiation procedure of a network service does not need to be manually interrupted. That is, a service configuration command does not need to be manually modified at a service configuration stage of the network service. This avoids a configuration error caused by manual editing and modification, and implements automatic service configuration of the network service. In addition, because the instantiation procedure of the network service is not interrupted, network service go-live efficiency is improved.

Figure 5:
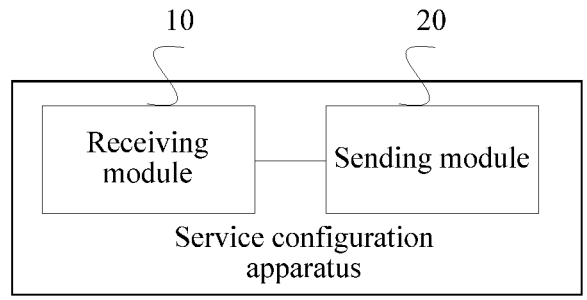
FIG. 5 is a schematic structural diagram of a service configuration apparatus for a network service according to an embodiment of this application.

FIG. 5 is a schematic structural diagram of a service configuration apparatus for a network service according to an embodiment of this application. The service configuration apparatus may implement a part or all of a management orchestrator MANO by using software, hardware, or software in combination with hardware. As shown in FIG. 5, the apparatus includes a receiving module 10 and a sending module 20.

The receiving module 10 is configured to receive a network service instantiation request, where the network service instantiation request includes a preset service configuration event that is for a network service and that is related to a network environment of a carrier.

The sending module 20 is configured to send service configuration information to a configuration system according to the service configuration event, so that the configuration system performs service configuration on the network service according to the service configuration information.

Optionally, the receiving module 10 may correspond to an input interface or an input component that has a communication function and an information receiving function and that is in the MANO. The sending module 20 may correspond to an output interface or an output component that has a communication function and an information sending function and that is in the MANO.

The service configuration apparatus for a network service provided in this embodiment of this application can perform the foregoing method embodiment. An implementation principle and a technical effect of the service configuration apparatus are similar to those of the method embodiment. Details are not described herein again.

Optionally, the service configuration event is used to indicate a service configuration template or a workflow that is executed by the network service in a current operation scenario.

Optionally, the service configuration event includes a name of the service configuration event, the service configuration template in the current scenario, and a service parameter required when the service configuration template is being executed.

Optionally, the sending module 20 is configured to send the service configuration event to the configuration system, so that the configuration system performs service configuration on the network service according to the service configuration event.

Figure 6:
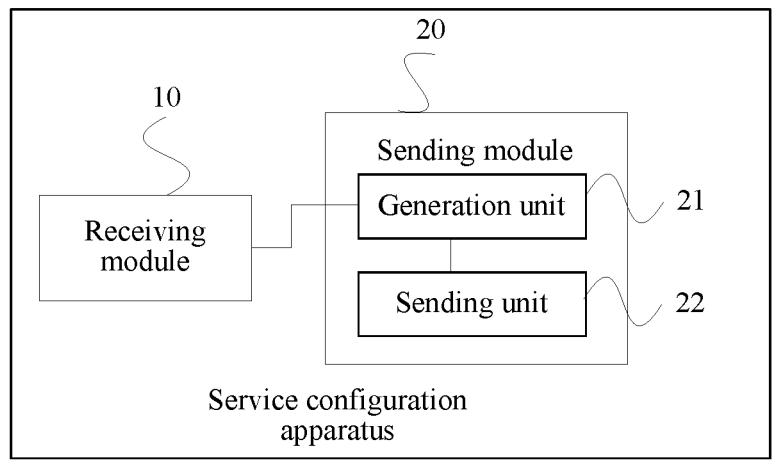
FIG. 6 is a schematic structural diagram of a service configuration apparatus for a network service according to an embodiment of this application.

FIG. 6 is a schematic structural diagram of a service configuration apparatus for a network service according to an embodiment. As shown in FIG. 6, the apparatus includes a receiving module 10 and a sending module 20. As shown in FIG. 6, the sending module 20 includes a generation unit 21 and a sending unit 22.

The generation unit 21 is configured to generate a service configuration command according to the name of the service configuration event, the service configuration template in the current operation scenario, and the service parameter that are in the service configuration event.

The sending unit 22 is configured to send the service configuration command to the configuration system, so that the configuration system performs service configuration on the network service according to the service configuration command.

Further, the receiving module 10 is further configured to receive a service configuration result sent by the configuration system.

Optionally, the network service is a virtualized network function VNF, the network service instantiation request is a VNF instantiation request, and the service configuration event is used to indicate a service configuration template or a workflow that is executed by the VNF in the current operation scenario. Optionally, the service configuration event is carried in a virtualized network function descriptor VNFD in the VNF instantiation request.

Optionally, the network service includes a virtualized network function VNF and a physical network function PNF, and the service configuration event is used to indicate a first service configuration template or a first workflow that is executed by the VNF in the current operation scenario, and a second service configuration template or a second workflow that is executed by the PNF in the current operation scenario. Optionally, the service configuration event is carried in a network service descriptor NSD in the network service instantiation request.

Optionally, the service configuration event is further used to indicate a service configuration template or a workflow that is executed by a virtualization deployment unit VDU of the VNF in the current operation scenario.

Optionally, the current operation scenario includes any one of an initialization scenario, a resilience scenario, an upgrade scenario, a security matrix scenario, or a service termination scenario.

The service parameter includes at least one parameter of an IP address of a local end, a port of the local end, an IP address of a peer end, a port of the peer end, or a service type supported by the network service.

The service configuration apparatus for a network service provided in this embodiment of this application can perform the foregoing method embodiment. An implementation principle and a technical effect of the service configuration apparatus are similar to those of the method embodiment. Details are not described herein again.

Figure 7:
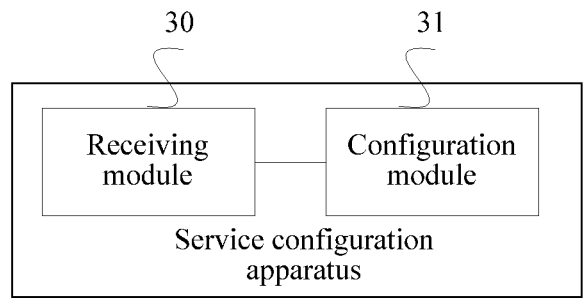
FIG. 7 is a schematic structural diagram of a service configuration apparatus for a network service according to an embodiment of this application.

FIG. 7 is a schematic structural diagram of a service configuration apparatus for a network service according to an embodiment of this application. The service configuration apparatus may implement a part or all of a configuration system by using software, hardware, or software in combination with hardware. As shown in FIG. 7, the apparatus includes a receiving module 30 and a configuration module 31.

The receiving module 30 is configured to receive service configuration information sent by a management orchestrator MANO according to a service configuration event that is for a network service and that is related to a network environment of a carrier.

The configuration module 31 is configured to perform service configuration on the network service according to the service configuration information.

Optionally, the receiving module 30 may correspond to an input interface or an input component that has a communication function and an information receiving function and that is in the configuration system. The configuration module 31 may correspond to a processing component or a processing chip that has a service configuration function and another function and that is in the configuration system.

The service configuration apparatus for a network service provided in this embodiment of this application can perform the foregoing method embodiment. An implementation principle and a technical effect of the service configuration apparatus are similar to those of the method embodiment. Details are not described herein again.

Optionally, the service configuration event is used to indicate a service configuration template or a workflow that is executed by the network service in a current operation scenario.

Optionally, the service configuration event includes a name of the service configuration event, the service configuration template in the current scenario, and a service parameter required when the service configuration template is being executed.

Figure 8:
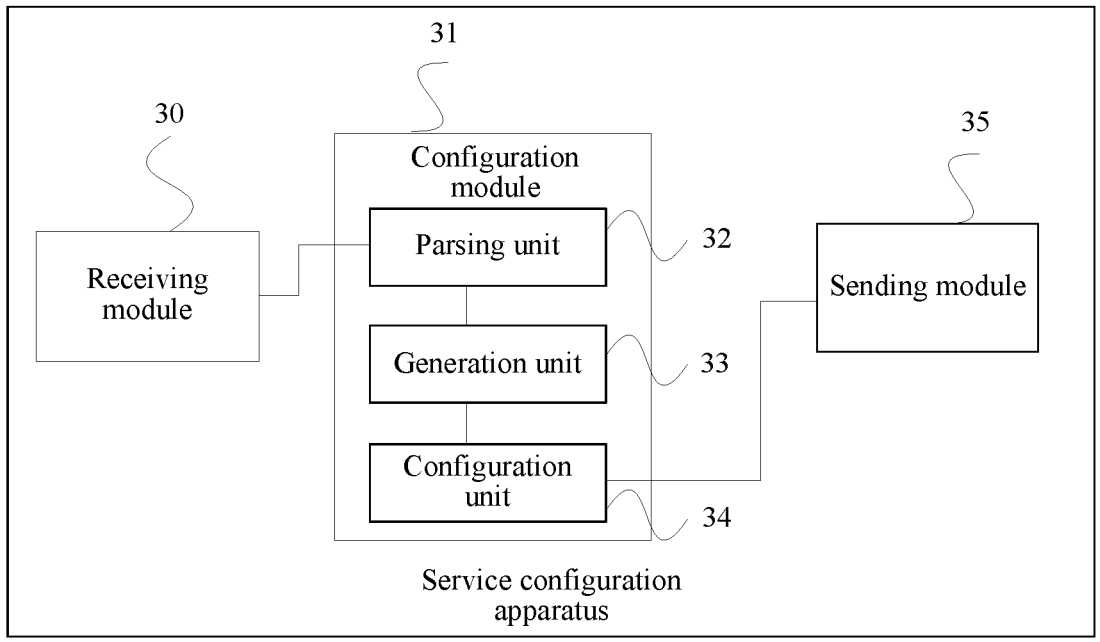
FIG. 8 is a schematic structural diagram of a service configuration apparatus for a network service according to an embodiment of this application.

FIG. 8 is a schematic structural diagram of a service configuration apparatus for a network service according to an embodiment of this application. As shown in FIG. 8, the apparatus includes a receiving module 30 and a configuration module 31. As shown in FIG. 8, the configuration module 31 includes a parsing unit 32, a generation unit 33, and a configuration unit 34.

The parsing unit 32 is configured to parse the service configuration event to obtain the name of the service configuration event, the service configuration template in the current scenario, and the service parameter.

The generation unit 33 is configured to generate a service configuration command according to the name of the service configuration event, the service configuration template in the current scenario, and the service parameter.

The configuration unit 34 is configured to perform service configuration on the network service according to the service configuration command.

Optionally, the apparatus may further include a sending module 35, configured to send a service configuration result to the MANO.

Optionally, the receiving module 30 is configured to receive a service configuration command sent by the MANO, where the service configuration command is generated by the MANO according to the name of the service configuration event, the service configuration template in the current scenario, and the service parameter. The configuration module 31 is configured to perform service configuration on the network service according to the service configuration command.

Optionally, the network service includes a virtualized network function VNF, and the service configuration event is used to indicate a service configuration template or a workflow that is executed by the VNF in the current operation scenario. Optionally, the service configuration event is carried in a virtualized network function descriptor VNFD in a VNF instantiation request received by the MANO.

Optionally, the network service includes a virtualized network function VNF and a physical network function PNF, and the service configuration event is used to indicate a first service configuration template or a first workflow that is executed by the VNF in the current operation scenario, and a second service configuration template or a second workflow that is executed by the PNF in the current operation scenario. Optionally, the service configuration event is carried in a network service descriptor NSD in a network service instantiation request received by the MANO.

Optionally, the service configuration event is further used to indicate a service configuration template or a workflow that is executed by a virtualization deployment unit VDU of the VNF in the current operation scenario.

Optionally, the current operation scenario includes any one of an initialization scenario, a resilience scenario, an upgrade scenario, a security matrix scenario, or a service termination scenario. The service parameter includes at least one parameter of an IP address of a local end, a port of the local end, an IP address of a peer end, a port of the peer end, or a service type supported by the network service.

The service configuration apparatus for a network service provided in this embodiment of this application can perform the foregoing method embodiment. An implementation principle and a technical effect of the service configuration apparatus are similar to those of the method embodiment. Details are not described herein again.

Figure 9:
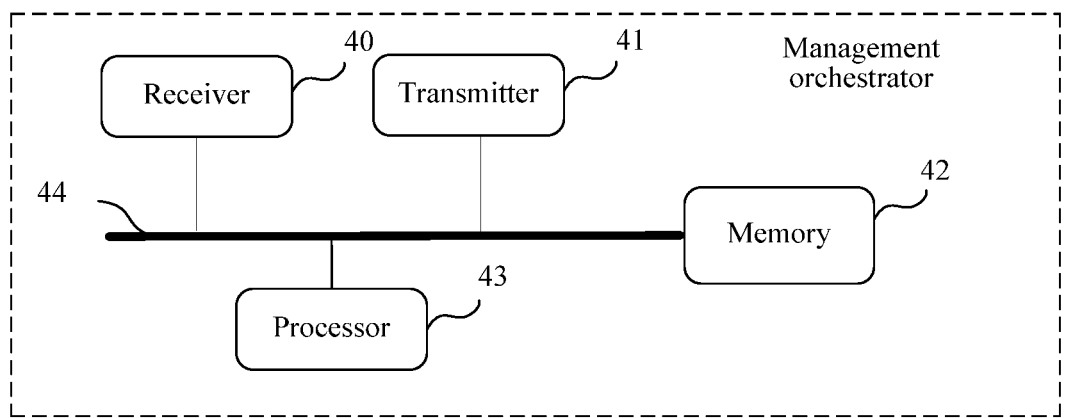
FIG. 9 is a schematic structural diagram of an embodiment of a management orchestrator according to an embodiment of this application.

FIG. 9 is a schematic structural diagram of an embodiment of a management orchestrator according to an embodiment of this application. As shown in FIG. 9, the management orchestrator may include a receiver 40, a transmitter 41, a memory 42, a processor 43, and at least one communications bus 44. The communications bus 44 is configured to implement communication connection between components. The memory 42 may include a high-speed RAM memory, and may further include a non-volatile memory NVM, for example, at least one magnetic disk memory. The memory 42 may store various programs, so as to implement various processing functions and implement operations of the method embodiment. In addition, the receiver 40 in this embodiment may be a corresponding input interface having a communication function and an information receiving function. The transmitter 41 in this embodiment may be a corresponding output interface having a communication function and an information sending function. The transmitter 41 and the receiver 40 may be integrated into one communications interface, or may be respectively two independent communications interfaces. The processor 43 may be, for example, a central processing unit (CPU), or may be a processing chip having a function of generating a service configuration command and another function.

It should be noted that, the communications bus may be an ISA (, industry standard architecture) bus, a PCI (peripheral component interconnect) bus, an EISA (extended industry standard architecture) bus, or the like. The communications bus may be one or more physical lines, and when the bus is multiple physical lines, the bus may be classified into an address bus, a data bus, a control bus, and the like.

In this embodiment of this application, the receiver 40 is configured to receive a network service instantiation request, where the network service instantiation request includes a preset service configuration event that is for a network service and that is related to a network environment of a carrier.

The transmitter 41 is configured to send service configuration information to a configuration system according to the service configuration event, so that the configuration system performs service configuration on the network service according to the service configuration information.

The MANO may include three components: an NFVO, a VNFM, and a VIM. That is, the NFVO, the VNFM, and the VIM are all a part of the MANO. The NFVO, the VNFM, and the VIM may be separately deployed on different hardware devices and form all or a part of the MANO by means of physical connection, or may be deployed on a same hardware device (that is, software having functions of the NFVO, the VNFM, and the VIM is loaded on the hardware device) and form all or a part of the MANO. Optionally, when the MANO includes an NFVO, a VNFM, and a VIM deployed on different hardware devices, the receiver 40, the transmitter 41, and the processor 43 may be integrated into the VNFM. Optionally, when the MANO includes an NFVO, a VNFM, and a VIM deployed on a same hardware device, a position in which the receiver 40 and the transmitter 41 are integrated is not limited.

Optionally, the service configuration event is used to indicate a service configuration template or a workflow that is executed by the network service in a current operation scenario.

Optionally, the service configuration event includes a name of the service configuration event, the service configuration template in the current scenario, and a service parameter required when the service configuration template is being executed.

Optionally, the transmitter 41 is configured to send the service configuration event to the configuration system, so that the configuration system performs service configuration on the network service according to the service configuration event.

Optionally, the processor 43 is configured to generate a service configuration command according to the name of the service configuration event, the service configuration template in the current operation scenario, and the service parameter that are in the service configuration event. The transmitter 41 is configured to send the service configuration command generated by the processor 43 to the configuration system, so that the configuration system performs service configuration on the network service according to the service configuration command.

Optionally, the receiver 40 is further configured to receive a service configuration result sent by the configuration system.

Optionally, the network service is a virtualized network function VNF, the network service instantiation request is a VNF instantiation request, and the service configuration event is used to indicate a service configuration template or a workflow that is executed by the VNF in the current operation scenario. Optionally, the service configuration event is carried in a virtualized network function descriptor VNFD in the VNF instantiation request.

Optionally, the network service includes a virtualized network function VNF and a physical network function PNF, and the service configuration event is used to indicate a first service configuration template or a first workflow that is executed by the VNF in the current operation scenario, and a second service configuration template or a second workflow that is executed by the PNF in the current operation scenario. Optionally, the service configuration event is carried in a network service descriptor NSD in the network service instantiation request.

Optionally, the service configuration event is further used to indicate a service configuration template or a workflow that is executed by a virtualization deployment unit VDU of the VNF in the current operation scenario.

Optionally, the current operation scenario includes any one of an initialization scenario, a resilience scenario, an upgrade scenario, a security matrix scenario, or a service termination scenario.

The service parameter includes at least one parameter of an IP address of a local end, a port of the local end, an IP address of a peer end, a port of the peer end, or a service type supported by the network service.

The management orchestrator provided in this embodiment of this application can perform the foregoing method embodiment, An implementation principle and a technical effect of the management orchestrator are similar to those of the method embodiment. Details are not described herein again.

Figure 10:
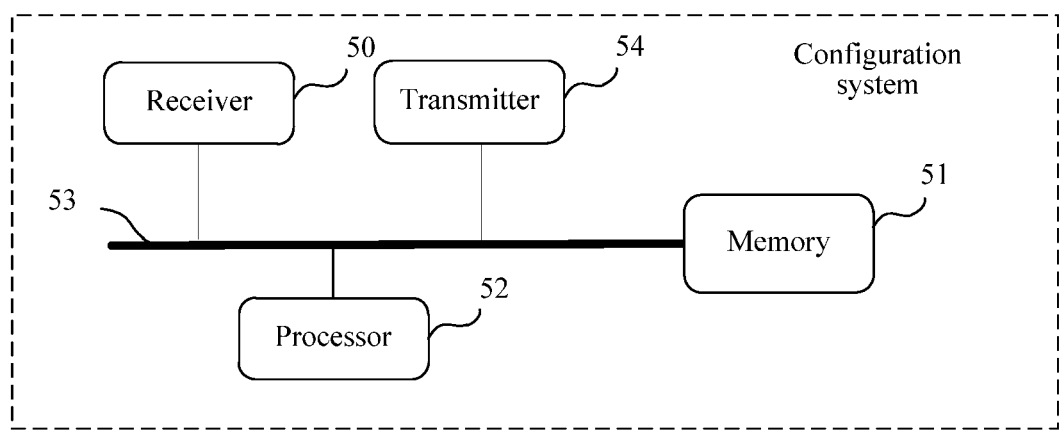
FIG. 10 is a schematic structural diagram of an embodiment of a configuration system according to an embodiment of this application.

FIG. 10 is a schematic structural diagram of an embodiment of a configuration system according to an embodiment of this application. The configuration system may be an EM, or may be an OSS. As shown in FIG. 10, the configuration system may include a receiver 50, a memory 51, a processor 52, and at least one communications bus 53. Optionally, the configuration system may further include a transmitter 54. The communications bus 53 is configured to implement communication connection between components. The memory 51 may include a high-speed RAM memory, and may further include a non-volatile memory NVM, for example, at least one magnetic disk memory. The memory 51 may store various programs, so as to implement various processing functions and implement operations of the method embodiment. In addition, the receiver 50 in this embodiment may be a corresponding input interface having a communication function and an information receiving function. The transmitter 51 in this embodiment may be a corresponding output interface having a communication function and an information sending function. The transmitter 54 and the receiver 50 may be integrated into one communications interface, or may be respectively two independent communications interfaces. The processor 52 may be, for example, a central processing unit 52 (CPU), or may be a processing chip having a service configuration function and another function.

In this embodiment, the receiver 50 is configured to receive service configuration information sent by a management orchestrator MANO according to a service configuration event that is for a network service and that is related to a network environment of a carrier.

The processor 52 is configured to perform service configuration on the network service according to the service configuration information.

Optionally, the service configuration event is used to indicate a service configuration template or a workflow that is executed by the network service in a current operation scenario.

Optionally, the service configuration event includes a name of the service configuration event, the service configuration template in the current scenario, and a service parameter required when the service configuration template is being executed.

Optionally, the processor 52 is configured to parse the service configuration event to obtain the name of the service configuration event, the service configuration template in the current scenario, and the service parameter; generate a service configuration command according to the name of the service configuration event, the service configuration template in the current scenario, and the service parameter; and perform service configuration on the network service according to the service configuration command.

Optionally, the receiver 50 is configured to receive a service configuration command sent by the MANO, where the service configuration command is generated by the MANO according to the name of the service configuration event, the service configuration template in the current scenario, and the service parameter. The processor 52 is configured to perform service configuration on the network service according to the service configuration command.

Optionally, the transmitter 54 is configured to send a service configuration result to the MANO.

Optionally, the network service includes a virtualized network function VNF, and the service configuration event is used to indicate a service configuration template or a workflow that is executed by the VNF in the current operation scenario. Optionally, the service configuration event is carried in a virtualized network function descriptor VNFD in a VNF instantiation request received by the MANO.

Optionally, the network service includes a virtualized network function VNF and a physical network function PNF, and the service configuration event is used to indicate a first service configuration template or a first workflow that is executed by the VNF in the current operation scenario, and a second service configuration template or a second workflow that is executed by the PNF in the current operation scenario. Optionally, the service configuration event is carried in a network service descriptor NSD in a network service instantiation request received by the MANO.

Optionally, the service configuration event is further used to indicate a service configuration template or a workflow that is executed by a virtualization deployment unit VDU of the VNF in the current operation scenario.

Optionally, the current operation scenario includes any one of an initialization scenario, a resilience scenario, an upgrade scenario, a security matrix scenario, or a service termination scenario. The service parameter includes at least one parameter of an IP address of a local end, a port of the local end, an IP address of a peer end, a port of the peer end, or a service type supported by the network service.

The configuration system provided in this embodiment of this application can perform the foregoing method embodiment. An implementation principle and a technical effect of the configuration system are similar to those of the method embodiment. Details are not described herein again.

Figure 11:
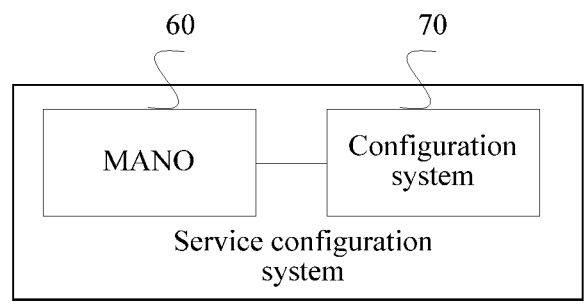
FIG. 11 is a schematic structural diagram of an embodiment of a service configuration system for a network service according to an embodiment of this application.
Figure 12:
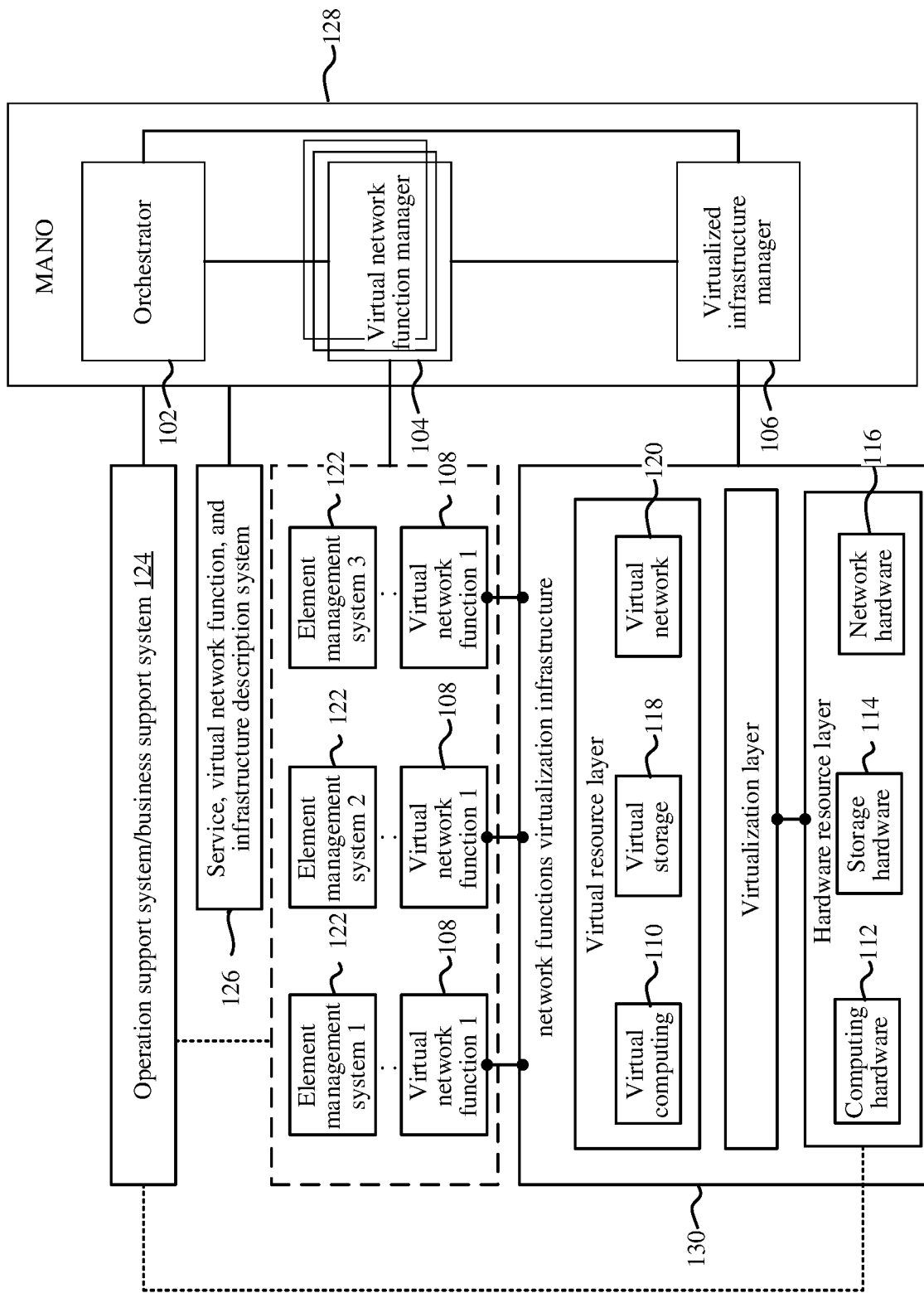
FIG. 12 is a diagram of an NFV MANO architecture according to an embodiment of this application.

FIG. 11 is a schematic structural diagram of an embodiment of a service configuration system for a network service according to an embodiment of this application. As shown in FIG. 11, the service configuration system may include the foregoing MANO and the foregoing configuration system. The service configuration system may be applied to the diagram of the NFV MANO architecture shown in FIG. 1, or may be applied to the diagram of the NFV MANO architecture shown in FIG. 12. The diagram of the NFV MANO architecture shown in FIG. 12 is a refinement of the diagram of the NFV MANO architecture shown in FIG. 1. To describe an operating principle and beneficial effects of the service configuration system more clearly, in this embodiment, FIG. 12 is first used as an example to describe the NFV MANO architecture.

In FIG. 12, an NFV MANO system may be implemented by using multiple types of networks, for example, a data center network, a service provider network, or a local area network (LAN). The NFV MANO system may include a MANO 128, an NFVI 130, multiple VNFs 108, multiple element management systems (EMS) 122, a service, VNF and infrastructure description system 126, and one or more OSSs/BSSs 124. It should be noted that, the configuration system in this embodiment of this application may be the OSS in FIG. 12, or may be the EMS in FIG. 12.

The MANO 128 may include a network functions virtualization orchestrator NFVO) 102, one or more VNF managers (VNFM) 104, and one or more virtualized infrastructure managers (VIM) 106.

The NFVI 130 may include a hardware resource layer including computing hardware 112, storage hardware 114, and network hardware 116, a virtualization layer, and a virtual resource layer including virtual computing 110 (for example, a virtual machine), a virtual storage 118, and a virtual network 120. The computing hardware 112 may be a special-purpose processor, or a general-purpose processor configured to provide processing and computing functions. The storage hardware 114 is configured to provide a storage capability. The storage capability may be provided by the storage hardware 114 (for example, a local memory of a server), or may be provided by using a network (for example, a server is connected to a network storage device by using a network). The network hardware 116 may be a switch, a router, and/or another network device. The network hardware 116 is configured to implement communication between multiple devices, and the multiple devices are connected in a wireless or wired manner. The virtualization layer in the NFVI 130 is configured to abstract a hardware resource from the hardware resource layer, and decouple the VNF 108 from a physical layer to which the hardware resource belongs, to provide a virtual resource to the VNFs. As shown in FIG. 12, the virtual resource may include the virtual computing 110, the virtual storage 118, and the virtual network 120. The virtual computing 110 and the virtual storage 118 may be provided to the VNF 108 in a form of a virtual machine or another virtual container. For example, one or more VNFs 108 may be deployed on one virtual machine. The virtualization layer forms the virtual network 120 by abstracting the network hardware 116. The virtual network 120, for example, a virtual switch (such as Vswitches) is configured to implement communication between multiple virtual machines, or between multiple virtual containers of other types that carry VNFs. Virtualization of the network hardware may be implemented by using a technology such as a virtual LAN (VLAN), a virtual private local area network service (VPLS), a virtual extensible local area network (VxLAN), or network virtualization using Generic Routing Encapsulation (NVGRE).

Primarily oriented to a telecommunications service provider, the OSS/BSS 124 provides an integrated network management and service operation function, including network management (for example, fault monitoring and network information collection), accounting management, and customer service management. The VNF and infrastructure description system 126 is described in detail in the standard ETSI GS NFV 002 v. 1.1. Details are not described herein in this embodiment of this application.

The MANO 128 may be configured to implement monitoring and management of the VNF 108 and the NFVI 130. The NFVO 102 may communicate with the one or more VNFMs 104, to implement a resource-related request, send configuration information to the VNFM 104, and collect status information of the VNF 108. In addition, the NFVO 102 may further communicate with the VIM 106, to implement resource allocation, and/or implement reservation and exchange of configuration information and status information of a virtualized hardware resource. The VNFM 104 may be configured to manage one or more VNFs 108 and perform various management functions, for example, initializing, updating, querying, and/or terminating the VNF 108. The VIM 106 may be configured to control and manage interaction between the VNF 108 and the computing hardware 112, the storage hardware 114, the network hardware 116, the virtual computing 110, the virtual storage 118, and the virtual network 120. For example, the VIM 106 may be configured to allocate a resource to the VNF 108. The VNFM 104 and the VIM 106 may communicate with each other to exchange configuration information and status information of a virtualized hardware resource.

The NFVI 130 includes hardware and software, and the hardware and the software jointly create a virtualization environment to deploy, manage, and execute the VNF 108. In other words, the hardware resource layer and the virtual resource layer are configured to provide a virtual resource, for example, a virtual machine and/or a virtual container in another form, to the VNF 108.

Still referring to FIG. 12, the VNFM 104 may communicate with the VNF 108 and the EMS 122 to perform VNF life cycle management and implement exchange of configuration information/status information. The VNF 108 is virtualization of at least one network function, and the network function is previously provided by a physical network device. In an implementation, the VNF 108 may be a virtualized mobility management entity (MME) node, configured to provide all network functions provided by a typical non-virtualized MME device. In another implementation, the VNF 108 may be configured to implement functions of some of all components provided by the non-virtualized MME device. One or more VNFs 108 may be deployed on one virtual machine (or one virtual container in another form). The EMS 122 may be configured to manage one or more VNFs.

Therefore, referring to the NFV MANO architecture shown in FIG. 12, the service configuration system provided in this embodiment of this application may include a MANO 60 and a configuration system 70.

The MANO 60 is configured to receive a network service instantiation request, and send service configuration information to the configuration system 70 according to a service configuration event. The network service instantiation request includes a preset service configuration event that is for a network service and that is related to a network environment of a carrier.

The configuration system 70 is configured to receive the service configuration information sent by the MANO 60 according to the service configuration event that is for the network service and that is related to the network environment of the carrier, and perform service configuration on the network service according to the service configuration information.

Optionally, the service configuration event is used to indicate a service configuration template or a workflow that is executed by the network service in a current operation scenario.

Optionally, the service configuration event includes a name of the service configuration event, the service configuration template in the current scenario, and a service parameter required when the service configuration template is being executed.

Optionally, the MANO 60 is configured to send the service configuration event to the configuration system 70, so that the configuration system 70 performs service configuration on the network service according to the service configuration event.

The configuration system 70 is configured to parse the service configuration event to obtain the name of the service configuration event, the service configuration template in the current scenario, and the service parameter; generate a service configuration command according to the name of the service configuration event, the service configuration template in the current scenario, and the service parameter; and perform service configuration on the network service according to the service configuration command.

Optionally, the MANO 60 is configured to generate the service configuration command according to the name of the service configuration event, the service configuration template in the current operation scenario, and the service parameter that are in the service configuration event, and send the service configuration command to the configuration system 70, so that the configuration system 70 performs service configuration on the network service according to the service configuration command.

The configuration system 70 is configured to receive the service configuration command sent by the MANO 60, and perform service configuration on the network service according to the service configuration command.

Optionally, the configuration system 70 is further configured to send a service configuration result to the MANO 60. The MANO 60 is further configured to receive the service configuration result sent by the configuration system 70.

Optionally, the network service is a virtualized network function VNF, the network service instantiation request is a VNF instantiation request, and the service configuration event is used to indicate a service configuration template or a workflow that is executed by the VNF in the current operation scenario. Optionally, the service configuration event is carried in a virtualized network function descriptor VNFD in the VNF instantiation request.

Optionally, the network service includes a virtualized network function VNF and a physical network function PNF, and the service configuration event is used to indicate a first service configuration template or a first workflow that is executed by the VNF in the current operation scenario, and a second service configuration template or a second workflow that is executed by the PNF in the current operation scenario. Optionally, the service configuration event is carried in a network service descriptor NSD in the network service instantiation request.

Optionally, the service configuration event is further used to indicate a service configuration template or a workflow that is executed by a virtualization deployment unit VDU of the VNF in the current operation scenario.

Optionally, the current operation scenario includes any one of an initialization scenario, a resilience scenario, an upgrade scenario, a security matrix scenario, or a service termination scenario. The service parameter includes at least one parameter of an IP address of a local end, a port of the local end, an IP address of a peer end, a port of the peer end, or a service type supported by the network service.

The service configuration system for a network service provided in this embodiment of this application can perform the foregoing method embodiment. An operating principle and a technical effect of the service configuration system are similar to those of the method embodiment. Details are not described herein again.

The embodiments in this specification are all described in a progressive manner, mutual reference may be made to the same or similar part of the embodiments, and each embodiment focuses on a difference from other embodiments. Especially, an apparatus embodiment is basically similar to a method embodiment, and therefore is described briefly; for related parts, refer to partial descriptions in the method embodiment. The described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or in part, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service configuration method for a network service, comprising:
receiving a network service instantiation request, wherein the network service instantiation request comprises a preset service configuration event that is for a network service and that is related to a network environment of a carrier; and
sending service configuration information to a configuration system according to the service configuration event, wherein the configuration system performs service configuration on the network service according to the service configuration information, wherein the service configuration event comprises a name of the service configuration event, a service configuration template in a current operation scenario, and a service parameter required when the service configuration template is being executed, the sending service configuration information to the configuration system according to the service configuration event including:
automatically generating a service configuration command according to the name of the service configuration event, the service configuration template in a current operation scenario, and the service parameter that are in the service configuration event; and
sending the service configuration command to the configuration system, wherein the configuration system performs service configuration on the network service according to the service configuration command.

2. The method according to claim 1, wherein the service configuration event is used to indicate the service configuration template or a workflow that is executed by the network service in the current operation scenario.

3. The method according to claim 1, wherein the sending service configuration information to the configuration system according to the service configuration event, wherein the configuration system performs service configuration on the network service according to the service configuration information comprises:
sending the service configuration event to the configuration system, wherein the configuration system performs service configuration on the network service according to the service configuration event.

4. The method according to claim 1, wherein the service configuration event is carried in a virtualized network function descriptor (VNFD) in a virtualized network function (VNF) instantiation request.

5. The method according to claim 1, wherein the service configuration event is carried in a network service descriptor (NSD) in the network service instantiation request.

6. The method according to claim 4, wherein the service configuration event is used to indicate the service configuration template or a workflow that is executed by a virtualization deployment unit (VDU) of the VNF in the current operation scenario.

7. A service configuration apparatus for a network service, comprising:
a memory that stores an executable program code;
a communications interface; and
at least one processor coupled to the memory and the communications interface, wherein the executable program code instructs the at least one processor to:
receive a network service instantiation request, wherein the network service instantiation request comprises a preset service configuration event that is for a network service and that is related to a network environment of a carrier; and
send service configuration information to a configuration system according to the service configuration event, wherein the configuration system performs service configuration on the network service according to the service configuration information, wherein the service configuration event comprises a name of the service configuration event, a service configuration template in the current scenario, and a service parameter required when the service configuration template is being executed, and wherein the executable program code instructs the at least one processor to
automatically generate a service configuration command according to a name of the service configuration event, a service configuration template in a current operation scenario, and a service parameter that are in the service configuration event; and
send the service configuration command to the configuration system, wherein the configuration system performs service configuration on the network service according to the service configuration command.

8. The apparatus according to claim 7, wherein the service configuration event is used to indicate the service configuration template or a workflow that is executed by the network service in the current operation scenario.

9. The apparatus according to claim 7, wherein the executable program code instructs the at least one processor to send the service configuration event to the configuration system, wherein the configuration system performs service configuration on the network service according to the service configuration event.

10. The apparatus according to claim 7, wherein the service configuration event is used to indicate the service configuration template or a workflow that is executed by a virtualization deployment unit (VDU) of a virtualized network function (VNF) in the current operation scenario.

11. A service configuration apparatus for a network service, comprising:
a memory that stores an executable program code;
a communications interface; and
at least one processor coupled to the memory and the communications interface, wherein the executable program code instructs the at least one processor to:
receive service configuration information sent by a management orchestrator (MANO) according to a service configuration event that is for a network service and that is related to a network environment of a carrier, wherein the executable program code instructs the at least one processor to
receive a service configuration command sent by the MANO, wherein the service configuration command is generated by the MANO according to a name of the service configuration event, a service configuration template in the current scenario, and a service parameter; and
perform service configuration on the network service according to the service configuration information, wherein the executable program code instructs the at least one processor to perform service configuration on the network service according to the service configuration command.

12. The apparatus according to claim 11, wherein the service configuration event is used to indicate the service configuration template or a workflow that is executed by the network service in the current operation scenario.

13. The apparatus according to claim 11, wherein the service configuration event is carried in a virtualized network function descriptor (VNFD) in a VNF instantiation request received by the MANO.

14. The apparatus according to claim 11, wherein the service configuration event is carried in a network service descriptor (NSD) in a network service instantiation request received by the MANO.

* * * * *